US011144432B2

(12) United States Patent
Joglekar et al.

(10) Patent No.: US 11,144,432 B2
(45) Date of Patent: *Oct. 12, 2021

(54) TESTING AND REPRODUCTION OF CONCURRENCY ISSUES

(71) Applicant: INTERNATIONAL BUSINESS MACHINES CORPORATION, Armonk, NY (US)

(72) Inventors: Amit P. Joglekar, Olathe, KS (US); Praveen Mohandas, Bothell, WA (US)

(73) Assignee: International Business Machines Corporation, Armonk, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/733,805

(22) Filed: Jan. 3, 2020

(65) Prior Publication Data
US 2020/0142805 A1 May 7, 2020

Related U.S. Application Data

(63) Continuation of application No. 15/944,831, filed on Apr. 4, 2018, now Pat. No. 10,579,501.

(51) Int. Cl.
*G06F 11/36* (2006.01)
*G06F 9/52* (2006.01)
*G06F 9/54* (2006.01)

(52) U.S. Cl.
CPC .......... *G06F 11/3632* (2013.01); *G06F 9/52* (2013.01); *G06F 9/547* (2013.01); *G06F 11/3636* (2013.01)

(58) Field of Classification Search
CPC .... G06F 11/3632; G06F 11/3636; G06F 9/52; G06F 9/547

(Continued)

(56) References Cited

U.S. PATENT DOCUMENTS 4,084,224 A * 4/1978 Appell .................. G06F 9/52
711/153
5,680,542 A * 10/1997 Mulchandani ...... G06F 11/1658
703/28

(Continued)

FOREIGN PATENT DOCUMENTS

WO 2006030195 A2 3/2006

OTHER PUBLICATIONS

Wahbe, "Efficient Data Breakpoints", ACM, pp. 200-212 (Year: 1992).*

(Continued)

*Primary Examiner* — Anil Khatri
(74) *Attorney, Agent, or Firm* — Michael A. Petrocelli

(57) ABSTRACT

A computer program product for testing a server code in a server concurrently handling multiple client requests includes creating a job-specific breakpoint in the server code using a library application programming interface, the job-specific breakpoint in the server code is enabled or disabled based on a job identifier, the library application programming interface controls the job-specific breakpoint in the server code and includes an application programming interface for establishing a new server connection with the server and retrieving the job identifier from the server associated with the established new server connection, pausing execution of a client job based on enabling the job-specific breakpoint in the server code using the library application programming interface, and resuming execution of the client job based on disabling the job-specific breakpoint in the server code using the library application programming interface.

9 Claims, 10 Drawing Sheets

(58) Field of Classification Search
USPC .................................................. 717/124–143
See application file for complete search history.

(56) References Cited

U.S. PATENT DOCUMENTS

| | | | | |
|---|---|---|---|---|
| 5,819,093 | A | 10/1998 | Davidson | |
| 5,822,588 | A * | 10/1998 | Sterling | G06F 11/3632 717/131 |
| 5,870,606 | A | 2/1999 | Lindsey | |
| 5,930,470 | A * | 7/1999 | Noguchi | G06F 11/2236 714/38.13 |
| 6,067,415 | A * | 5/2000 | Uchihira | G06F 8/30 717/106 |
| 6,145,123 | A * | 11/2000 | Torrey | G06F 9/30101 703/28 |
| 6,189,140 | B1 * | 2/2001 | Madduri | G06F 11/348 712/227 |
| 6,263,456 | B1 | 7/2001 | Boxall | |
| 6,282,701 | B1 | 8/2001 | Wygodny | |
| 6,286,130 | B1 * | 9/2001 | Poulsen | G06F 8/10 717/119 |
| 6,378,124 | B1 * | 4/2002 | Bates | G06F 11/3632 714/707 |
| 6,467,052 | B1 | 10/2002 | Kaler | |
| 6,477,702 | B1 | 11/2002 | Yellin | |
| 6,611,955 | B1 | 8/2003 | Logean | |
| 6,658,650 | B1 * | 12/2003 | Bates | G06F 11/362 714/E11.21 |
| 6,681,384 | B1 * | 1/2004 | Bates | G06F 9/52 714/35 |
| 6,718,294 | B1 * | 4/2004 | Bortfeld | G06F 11/3632 703/20 |
| 6,742,177 | B1 | 5/2004 | Dorak, Jr. | |
| 6,848,097 | B1 * | 1/2005 | Alverson | G06F 11/362 714/E11.21 |
| 6,931,631 | B2 | 8/2005 | Bates | |
| 7,020,871 | B2 | 3/2006 | Bernstein | |
| 7,203,926 | B2 * | 4/2007 | Bogle | G06F 9/45512 714/E11.21 |
| 7,383,539 | B2 | 6/2008 | Bates | |
| 7,421,705 | B2 * | 9/2008 | Laura | G06F 9/52 717/127 |
| 7,634,761 | B2 | 12/2009 | Buschardt | |
| 7,650,592 | B2 | 1/2010 | Eckels | |
| 7,774,757 | B1 | 8/2010 | Awasthi | |
| 7,844,953 | B2 * | 11/2010 | Morizawa | G06F 11/3632 717/126 |
| 7,900,201 | B1 | 3/2011 | Qureshi | |
| 8,392,885 | B2 | 3/2013 | Stall | |
| 8,402,218 | B2 * | 3/2013 | Gray | G06F 9/3834 711/115 |
| 8,418,418 | B2 | 4/2013 | Willham | |
| 8,615,750 | B1 | 12/2013 | Narayana Iyer | |
| 8,739,133 | B2 * | 5/2014 | Gritter | G06F 11/3636 717/127 |
| 8,756,461 | B1 * | 6/2014 | Jacob | G06F 11/2097 714/45 |
| 8,893,090 | B2 | 11/2014 | Halliday | |
| 9,021,428 | B2 | 4/2015 | Ajith Kumar | |
| 9,146,834 | B2 | 9/2015 | Smiljanic | |
| 2019/0310930 | A1 | 10/2019 | Joglekar | |

OTHER PUBLICATIONS

Turnbull et al, "Breakpoints: An Analysis of Potential Hypervisor Attack Vectors", IEEE, pp. 1-6 (Year: 2013).*
Bodden, "Stateful Breakpoints: A Practical Approach to Defining Parameterized Runtime Monitors", ACM pp. 492-495 (Year: 2011).*
Park et al, "Concurrent Breakpoints", ACM, pp. 331-332 (Year: 2012).*
Chern et al, "Debugging with Controlflow Breakpoints", ACM, pp. 96-106 (Year: 2007).*
Wahbe et al, "Practical Data Breakpoints: Design and Implementation", ACM, pp. 1-12 (Year: 1993).*
Salvaneschi et al, "Debugging for Reactive Programming", ACM, pp. 796-807 (Year: 2016).*
Zhang et al, "BPGen: An Automated Breakpoint Generator for Debugging", ACM, pp. 271-274 (Year: 2010).*
Fontana et al, "Visualizing sequences of debugging sessions using Swarm Debugging", IEEE, pp. 139-143 (Year: 2019).*
Barton, et al, "Dynamic and Graphical Web Page Breakpoints", WWW 2010, Apr. 26-30, 2010, Raleigh, North Carolina, pp. 81-90.
Iqbal, et al, "Understanding and Developing Models for Detecting and Differentiating Breakpoints during Interactive Tasks", CHI 2007 Proceedings—Tasks, Apr. 28-May 3, 2001, ACM, pp. 697-706.
Jeong, et al, "Breakpoint-based lightweight prefetching to improve application response", 2015 IEEE 9th Annual Internationas Computers, Software & Applications Conference, pp. 666-667.
Kessler, Peter, "Fast Breakpoints: Design and Implementation", ACM SIGPLAN, Year 1999, pp. 390-397.
Koch, et al, "Breakpoints and Breakpoint Detection in Source Level Emulation", Proceedings of the 9th International Symposium on System Synthetics (ISSS-96), IEEE, pp. 26-31.
Kucsuk, et al., "Systematic Debugging of Parallel Programs Based on Collective Breakpoints", 1999 Proceedings International Symposium on Software Engineering for Parallel and Distributed Systems, May 17-18, 1999, 4 pages.
List of IBM Patents or Patent Applications Treated as Related. Filed Herewith. 2 pages.
Mell et al., "The NIST Definition of Cloud Computing", Recommendations of the National Institute of Standards and Technology, Special Publication 800-145, Sep. 2011, 7 pages.
Yin, et al, "A Pointcut Language for Setting Advanced Breakpoints", AOSD '13, Mar. 24-29, 2013, pp. 145-156.
Zhang, et al., "BPGen: An Automated Breakpoint Generator for Debugging", !CSE' 10, May 2-8, 2010, Cape Town, South Africa, pp. 271-274.

* cited by examiner

```
function suspendIfFileExists(fileName)
    while (the <fileName> file exists in /tmp directory)
        sleep(N)  //  add N milliseconds delay
    end while
end function
```

FIG. 2

```
function suspendIfFileExists(fileName, jobId)
  while (file named <fileName>_<jobId> exists in /tmp directory)
    if (file named <fileName>_<jobId>.paused does not exist in /tmp directory)
      create file <fileName>_<jobId>.paused in /tmp directory
    end if
    sleep(N) // add N millisecond delay
  end while
  if (file named <fileName>_<jobId>.paused exists in /tmp directory)
    delete file <fileName>_<jobId>.paused from /tmp directory
  end if
end function
```

FIG. 3

```
1   job1 = createJob(<server>);
2   startExec(job1, <request1>,"begin");
3   continueExec(job1,"accessResource");
4   job2 = createJob(<server>);
5   startExec(job2, <request2>, "begin");
6   // Make sure the request in job2 is about to be
7   // queued (due to a dependency)
8   continueExec(job2, "queueTherequest");
9   continueExecAndWait(job2, "accessResource");
10  finishExec(job1);
11  // Now that the dependency has been resolved, wait for job2
12  //to reach the specified breakpoint "accessResource"
13  delayUntilBreakpoint(job2);
14  finishExec(job2);
15  job1.close();
16  job2.close();
```

FIG. 4

TESTING AND REPRODUCTION OF CONCURRENCY ISSUES

BACKGROUND

The present invention generally relates to computer systems, and more particularly to computer systems including a complex server architecture.

In order to support concurrency, modern servers, such as web servers and databases, require a highly complex architecture. These servers support concurrent requests from hundreds of clients while maintaining high performance. Typically, much of their complexity is hidden from clients. A client merely creates a job (e.g., session, transaction, context, or unit of work) on the server(s), sending multiple requests as part of that job. The server(s), on the other hand, handles multiple jobs submitted by all connected clients using very complicated workflows.

SUMMARY

According to an embodiment of the present disclosure, a computer program product for testing a server code in a server concurrently handling multiple client request includes a computer readable storage medium having program instructions embodied therewith, the computer readable storage medium is not a transitory signal per se, the program instructions executable by a device to cause the device to perform a method including creating a job-specific breakpoint in the server code using a library application programming interface, the job-specific breakpoint in the server code being enabled or disabled based on a job identifier dynamically retrieved during execution of the server code using the library application programming interface, the library application programming interface controls the job-specific breakpoint in the server code, the library application programming interface includes a plurality of readymade functions that execute, in a desired sequence, various synchronous and asynchronous program paths associated with the multiple client requests and are capable of establishing a new server connection with the server and retrieving the job identifier from the server associated with the established new server connection; based on the job identifier, pausing an execution of a client job by enabling the job-specific breakpoint in the server code using the library application programming interface; based on the job identifier, resuming the execution of the client job by disabling the job-specific breakpoint in the server code using the library application programming interface; debugging and reproducing one or more concurrency issues in the server code based on the pausing and resuming of the execution of the client job; writing, using the library application programming interface, readable and repeatable reproduction scripts and test cases containing interleaved executions of parallel client requests through various breakpoints. breakpoints; and performing, using the library application programming interface, one or more of the following error checks: determining whether a client job has been created, determining whether the client job is currently executing another client request, determining whether execution of the another client request is currently paused at a job-specific breakpoint, determining whether execution of the client job is currently paused at a specified asynchronous breakpoint, determining whether there is no future breakpoint specified for the client job, and determining whether a future breakpoint has been specified for the client job.

BRIEF DESCRIPTION OF THE DRAWINGS

The following detailed description, given by way of example and not intended to limit the invention solely thereto, will best be appreciated in conjunction with the accompanying drawings, in which:

FIG. 2 is an example of a breakpoint mechanism, according to an embodiment of the present disclosure;

FIG. 3 is an example of a job-aware breakpoint mechanism, according to an embodiment of the present disclosure;

FIG. 4 is an exemplary test case written using special library APIs, according to an embodiment of the present disclosure;

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
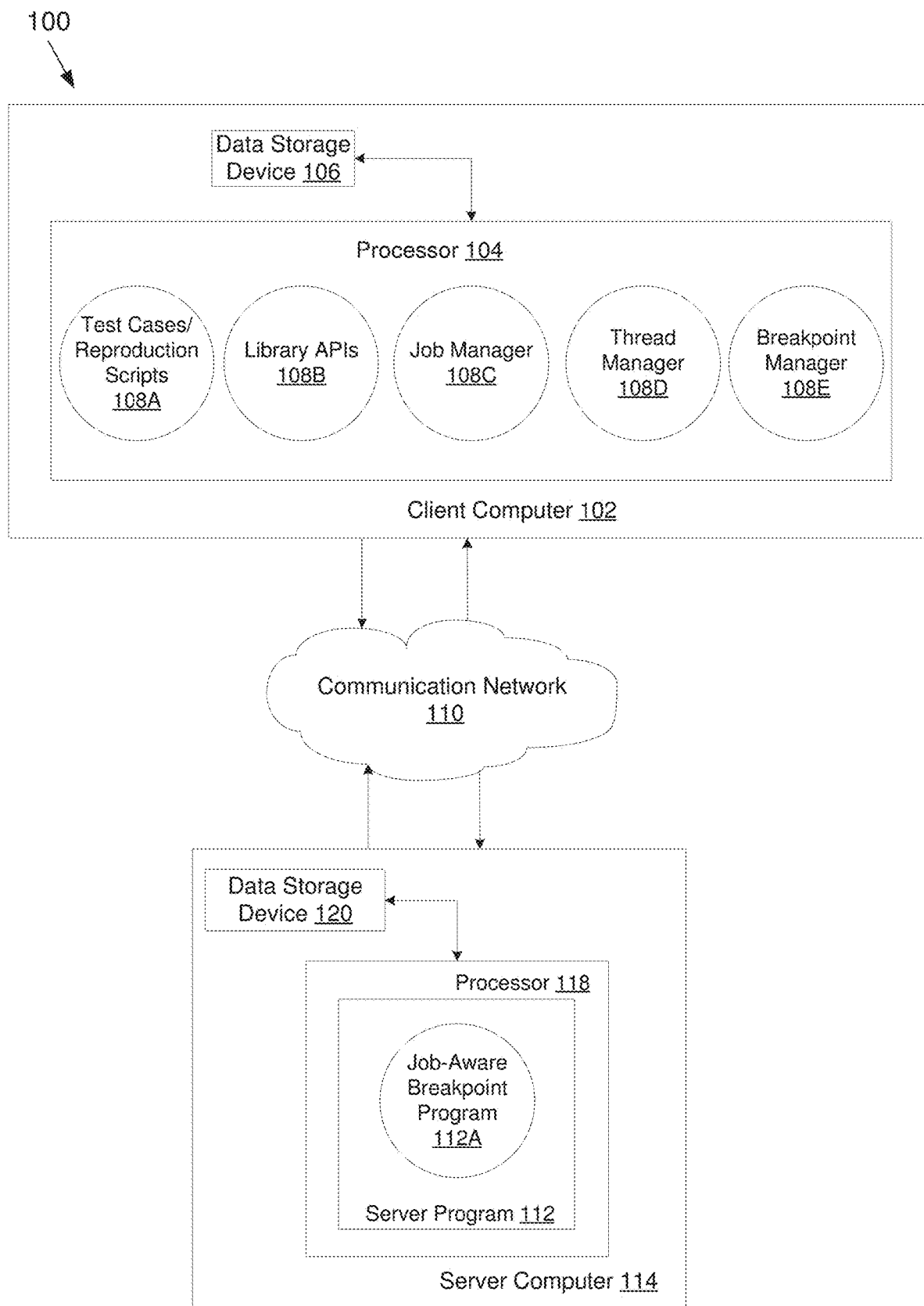
FIG. 1 is a block diagram illustrating a networked computer environment, according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

As previously explained, modern servers, such as web servers and databases, require a highly complex architecture in order to support concurrency. Concurrency generally refers to the simultaneous execution of multiple job requests. Servers are capable of handling jobs submitted by all connected clients using complex workflows. Typically, a server uses threads, processes, or an event-loop implementation based on a Reactor pattern to handle concurrent job requests from various clients. When a client accesses the server for the first time, the server may create a new job which is then used as the context for subsequent requests from that client. The server may use massively parallel processing (MPP), in which multiple nodes (e.g., computers, machines, or components) work together to parallelly process a client request. One of the nodes coordinates the tasks of splitting the work associated with the client's request, distributing the work to other nodes, and synthesizing the results of execution returned by those nodes. Depending on the MPP architecture, the coordinator node may be a special master node that distributes the work to its subordinates, or any node among a group of peer nodes may act as the coordinator node.

After completing the work associated with the client's request, the server may asynchronously perform a cleanup of data structures that may no longer be needed. The server may synchronously perform only necessary tasks in the client request (the client cannot submit the next request until this part of the processing is finished), and then return results back to the client. The client may then proceed to submit the subsequent request(s). Along with serving those new requests, the server may parallelly/asynchronously perform the cleanup tasks associated with previous client requests. Unfortunately, numerous concurrency issues arise during execution of a server code in complex server architectures, negatively affecting the previously described process.

Embodiments of the present disclosure generally relate to the field of computer systems, and more particularly to computer systems including a complex server architecture. The following described exemplary embodiments provide a system, method, and program product to, among other things, reproduce and debug various concurrency issues, and test various concurrency scenarios that typically arise in complex server architectures. Therefore, the present embodiment has the capacity to improve the technical field of computer systems including complex server architecture by, at a minimum, allowing the complex server system to pause or resume the execution of a server code in order to uncover and consistently reproduce concurrency issues. More specifically, embodiments of the present disclosure provide a mechanism for reproducing and debugging concurrency issues, and testing various concurrency scenarios typically present during execution of a server code in complex server architectures including, but not limited to:

a) Interaction between synchronous/asynchronous execution of requests submitted concurrently from two or more different client jobs, b) Interaction between nodes of a distributed system which process a given client request, c) Interaction between asynchronous execution of a previous client request and synchronous/asynchronous execution of a subsequent client request in the same job for a given client, and d) Effects of state changes on various concurrency scenarios. A state change may include an unforeseen event such as failure of a node in a cluster (e.g., a node goes down, then either remains down or comes back up and tries to resume, or rollback incomplete work) or any state change in a specialized state-machine used by server components (e.g., a two-phase commit protocol in distributed database servers).

As such, embodiments of the present disclosure enable the creation of readable and repeatable reproduction scripts and test cases containing interleaved executions of parallel requests through various breakpoints.

Referring now to FIG. 1, an exemplary networked computer environment 100 is depicted, according to an embodiment of the present disclosure. The networked computer environment 100 may include a client computer 102 with a processor 104 and a data storage device 106 that is enabled to run a plurality of programs including test cases/reproduction scripts 108A, library APIs 108B, job manager 108C, thread manager 108D, and breakpoint manager 108E. The networked computer environment 100 may also include a server computer 114 and a communication network 110. The networked computer environment 100 may include a plurality of client computers 102 and server computers 114, only one of which is shown. The communication network 110 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with a server program 112 running on server computer 114 via the communications network 110. The server program 112 includes a job-aware breakpoint program 112A. The client computer 102 may trigger the job-aware breakpoint program 112A to pause execution of a job (e.g., a job submitted by a client computer 102) at a breakpoint in the server program 112, and then resume the job beyond such breakpoint in the server program 112. The communication network 110 may include connections, such as wire, wireless communication links, or fiber optic cables. As will be discussed with reference to FIG. 7, server computer 114 may include internal components 702a and external components 704a, respectively, and client computer 102 may include internal components 702b and external components 704b, respectively. Client computer 102 may be, for example, a mobile device, a telephone (including smartphones), a personal digital assistant, a netbook, a laptop computer, a tablet computer, a desktop computer, an internet-based TV, or any type of computing devices capable of accessing a network.

Referring now to FIGS. 2-3, examples of a breakpoint mechanism are shown, according to an embodiment of the present disclosure. Complex servers may include a mechanism for suspending program execution. This mechanism is generally associated with a function which may be invoked during execution of the server program (e.g., server program 112 in FIG. 1). Such function invocations are pre-inserted at various places in the program code. These predefined locations are usually referred to as "breakpoints". A breakpoint may include an intentionally specified instruction within a computer program or code that temporarily suspends the execution of the program. The server program (e.g., server program 112 in FIG. 1) may also provide an external trigger so that a user trying to test or understand the flow of server execution or trying to reproduce or debug an issue in server execution, can pause or resume the execution at specific breakpoints.

As such, FIG. 2 shows an example of a simple breakpoint mechanism which checks for the existence of a file, usually in a common directory of the server computer (e.g., server computer 114 in FIG. 1), such as the temporary (temp) directory in Windows OS (/tmp in UNIX®, Linux and Mac OS), and delays further execution of server program 112 in FIG. 1 if the file is present. Depending on implementation of the server program 112 in FIG. 1, a sleep statement or an event-loop timer may be used to add the delay if the file is present. Accordingly, a breakpoint named "brkpt" may be added to the code by calling the function suspendIfFileExists ("brkpt"). Once such breakpoints are in place, they can be triggered externally. Thus, in order to pause execution at this breakpoint, the file /tmp/brkpt may be created in the server computer, and then to resume execution beyond the breakpoint the file /tmp/brkpt may be deleted.

This example of breakpoint execution may be inadequate for complex parallel processing systems in which multiple client jobs may simultaneously execute a code logic. For example, if client A and client B execute the same code path, it is not possible to pause execution only for client B (or A).

Alternatively, users may externally restrict the breakpoints to a specific job as shown in FIG. 3. The pseudo code of FIG. 3 contains an updated job-aware function suspendIfFileExists, described above, that may serve as the breakpoint. This function, as shown in FIG. 3, includes an additional 'jobId' argument. In this case, the job-specific breakpoint "brkpt" is added to the program code by calling the function using suspendIfFileExists ("brkpt", getIdOfCurrentJob ( )) where getIdOfCurrentJob ( ) dynamically returns an identifier of the current job at execution time. For example, if the job identifier is 16346, then the program execution is paused when file named /tmp/brkpt_16346 is present in the server computer, and then resumed when the file is removed. The breakpoint program of FIG. 3 may also create a new file whose name ends with "paused" when a job-specific breakpoint is reached. For example, a file named /tmp/brkpt_16346.paused is created in the server computer when the job 16346 reaches the breakpoint named "brkpt".

Although the breakpoint mechanisms described above may be useful in some cases, the manual process of enabling/disabling job-specific breakpoints at a precise point-in-time during execution of multiple concurrent jobs may be extremely tedious. Moreover, the breakpoint mechanisms previously described are not suitable for writing reproduction scripts and test cases.

Special library APIs that allow test cases and reproduction scripts to selectively pause or resume specific client jobs may be implemented by leveraging the job-specific breakpoint mechanism described above with reference to FIG. 3. Such library APIs may be used to write test cases and reproduction scripts that trigger breakpoint instructions in a complex server system executing multiple concurrent jobs. Depending upon client-side architecture, test cases and reproduction scripts may use the special library APIs by linking the library and invoking the APIs using in-memory function calls, or the special library APIs may be deployed as microservice(s) and invoked as web service requests or remote procedure calls. The library APIs may further be enhanced to pause or resume specific (client) jobs during synchronous as well as asynchronous code paths. Also, in case of distributed server architecture, the library APIs may be enhanced to pause or resume specific jobs in precise nodes of the distributed server system. Additionally, if the server system queues certain jobs due to a dependency or to prevent conflicting access to certain resource(s), and then automatically resubmits the queued jobs after the dependency or conflict is resolved (for example to support the 'serializable' isolation level in a relational database management system (RDBMS)), the library APIs may be enhanced accordingly. Embodiments by which the special library APIs may be implemented are described in detailed below by referring to the accompanying drawings in FIGS. 4-6.

The following terms will be used in the description of embodiments of the present disclosure:

Activate break point, enable break point, or create break point: refer to an action that causes the server code execution to pause or suspend at a breakpoint.

Deactivate break point, disable break point, or delete break point: refer to an action that removes a breakpoint so that the server code execution can be resumed or continued beyond the breakpoint.

Referring now to FIG. 4, an exemplary test case (hereinafter "test case") written using special library APIs is shown, according to an embodiment of the present disclosure. In this embodiment, the test case creates a new job job1 (line 1), then executes a request request1 in the job and pauses execution of the request at a couple of breakpoints named "begin" and "accessResource" (lines 2 and 3). Then, the test case starts another job job2, executes a request request2 in the job and pauses execution of the request at the breakpoint named "begin" (lines 4 and 5). The test case ensures that job2 has been queued due to a dependency or conflict (lines 6 through 9). The test case finishes execution of the request in job1 (line 10) and then ensures that job2 has automatically proceeded further until breakpoint "accessResource" specified in line 9 (lines 11 through 13) because its dependency on or conflict with job1 has been resolved. Finally, the test case finishes execution of the request in job2 (line 14) and closes both jobs (lines 15 and 16).

As may be appreciated, the special library APIs (hereinafter referred to as "library APIs") can be used to create readable and easily understandable test cases and reproduction scripts that predictably and consistently execute, in a desired sequence, various program paths in a complex server for multiple concurrent client jobs. The library APIs may be used in test cases and reproduction scripts to selectively pause or resume specific concurrent client jobs during synchronous and asynchronous code paths in various nodes of a distributed system.

Specifically, a library API contains readymade functions that provide some functionality. In FIG. 4, for example, functions highlighted using bold text such as createJob ( ) and startExec ( ) are library APIs that are implemented by the creator of the library to perform a specific task. Thus, test cases and reproduction scripts invoke the appropriate library API to achieve the desired pause-resume dependencies between various jobs. The library APIs described herein have been written specifically to carry out embodiments of the present disclosure. These library APIs take care of numerous internal details including, for example, keeping track of job-ids, threads associated with jobs, current and/or future breakpoints for the threads, automatic create or remove of breakpoint files such as /tmp/brkpt_16346 on server computers. Accordingly, the library APIs can make the code in FIG. 4 readable and repeatable.

As mentioned above, the test case uses a job-aware breakpoint mechanism 112A (FIG. 1) in the server program 112 (FIG. 1). That is, the test case uses named breakpoints that have been added in the server code using calls such as suspendIfFileExists ("brkpt", getIdOfCurrentJob ( )) which pause server-side thread or process execution when a file named /tmp/brkpt_<job_id> is present in the server computer 114 (FIG. 1). As such, the server-side decision of whether to pause at a breakpoint or not is based on a job identifier. The job identifier may be dynamically retrieved during execution of the server code using the getIdOfCurrentJob ( ) call. For example, "queueTheRequest" in line 8 of FIG. 4 is a breakpoint added to the queuing logic in the server code using call suspendIfFileExists ("queueTheRequest", getIdOfCurrentJob ( ). If the queuing logic in server code is getting executed for a job (job2 in the test case in FIG. 4) that has identifier 32673, then the getIdOfCurrentJob ( ) call passes the value 32673 as second argument to the suspendIfFileExists ( ) function and execution of the job pauses if a file named /tmp/queueTheRequest_32673 exists on the server computer. The library APIs automatically create/delete job-specific breakpoints (e.g., a file such as /tmp/queueTheRequest_32673, where 32673 is identifier of job2) on a server computer.

The createJob ( ) API internally establishes a new server connection via the Job Manager 108C (FIG. 1). On the server-side, this results in creation of a new job. The createJob ( ) API may also retrieve a job identifier from the server using the Job Manager 108C (FIG. 1) which internally stores it for future use so that other library APIs may automatically create or delete job-specific breakpoints on a server computer. For example, the createJob API call on line 4 may create the job job2 on the server, retrieve identifier 32673 of the job from the server using the Job Manager 108C (FIG. 1) which internally stores the identifier in a data structure. Then, the startExec API call on line 5 may use the stored job-identifier to activate the breakpoint named "begin" for this job by creating file /tmp/begin_32673 on the server computer and then start execution of request request2 so that the request may pause at the breakpoint. The continueExec API call on line 8 may first activate the breakpoint named "queueTheRequest" by creating file /tmp/queueTheRequest_32673 on the server computer, and then deactivate the previous breakpoint by deleting file /tmp/begin_32673 from the server computer (e.g., server computer 114 in FIG. 1) so that execution of request2 may resume beyond the breakpoint "begin" and then pause at the breakpoint "queueTheRequest" in the server program (e.g., server program 112 in FIG. 1). Similarly, the continueExecAndWait API call on line 9 may activate a new breakpoint by creating file /tmp/accessResource_32673 on server computer and then deactivate the previous breakpoint by deleting the file /tmp/queueTheRequest_32673 from the server computer. Then, the finishExec API call on line 14 may delete file /tmp/accessResource_32673 from the server computer so that execution of request2 in the server may resume beyond the breakpoint and complete.

The APIs that start with startExec spawn a new thread of execution via Thread Manager 108D (FIG. 1). It should be noted that this is a thread in the library API created using syntax of the programming language used for implementing the library API, it is different than a thread that the server may create when a client sends a new job request to the server. It is necessary to create such a new thread during execution of the test case because, otherwise, execution of the test case cannot proceed. For example, assuming that job1 has identifier 28901, the startExec API call on line 2 of FIG. 4 causes execution of the job1 in server program to pause at breakpoint named "begin" by creating file /tmp/begin_28901 on the server computer. As such, the test case may not get back any response, instead it may only wait until execution of job1 is resumed. So, the startExec API internally uses a separate thread so that the test case execution may continue beyond line 2. As such, library APIs that start with startExec allow a single test case or reproduction script to create multiple concurrent jobs that have requests paused at or queued or executing in different parts of server code, and furthermore, in case of distributed servers, in different nodes of the server. The Thread Manager 108D (FIG. 1) internally stores mapping between the job and the thread in a data structure for future use by library APIs. Additionally, this and other library APIs that create job-specific breakpoints on the server computer, use Breakpoint Manager 108E (FIG. 1) to internally store mapping between a thread and a breakpoint for future use by library APIs. Also, library APIs that accept a list of nodes of a distributed server on which breakpoints are created, internally store the nodes' list for future use by library APIs.

The information about job identifiers, threads, breakpoints and nodes' list—which is internally stored by Job Manager 108C, Thread Manager 108D and Breakpoint Manager 108E (FIG. 1)—is used by library APIs not only for performing their specific tasks but also for checking whether the library APIs have been used at the right place in the test case or reproduction script. For example, the continueExec API uses information stored in the internal data structures to ensure that there is already a thread created for the job by a library API and that a library API has already paused execution of the thread at a breakpoint.

The library APIs may support breakpoints in synchronous and asynchronous execution paths of the server. Execution of a client request by the server program 112 (FIG. 1) may be logically divided into two phases: synchronous execution and asynchronous execution.

Synchronous execution: During this phase, the server program continues to execute the most current request received from a client; and it cannot accept the next request from the same client. If the request being executed is paused at some breakpoint in a synchronous code path, the job may appear to be hanging or unresponsive. At the end of this phase, results of request execution are returned back to the client and the server program is ready to pick up the next request in the job. It should be noted that the server program may continue to execute the asynchronous phase of this and other previous requests as described below.

Asynchronous execution: When executing a request, some portion of the work may be performed asynchronously by the server (e.g., cleanup of data structures used by the request), after synchronous execution of the request is complete. This is generally referred to as "asynchronous execution".

It should be noted that the description of FIGS. 5-6 below uses the terms breakpoint and actions create/remove breakpoints without referring to the temporary-file-based job-specific breakpoint mechanisms described above. The library API implementation described in FIGS. 5-6 may be used with any other job-specific breakpoint mechanism included in server programs 112 (FIG. 1).

Figure 5:
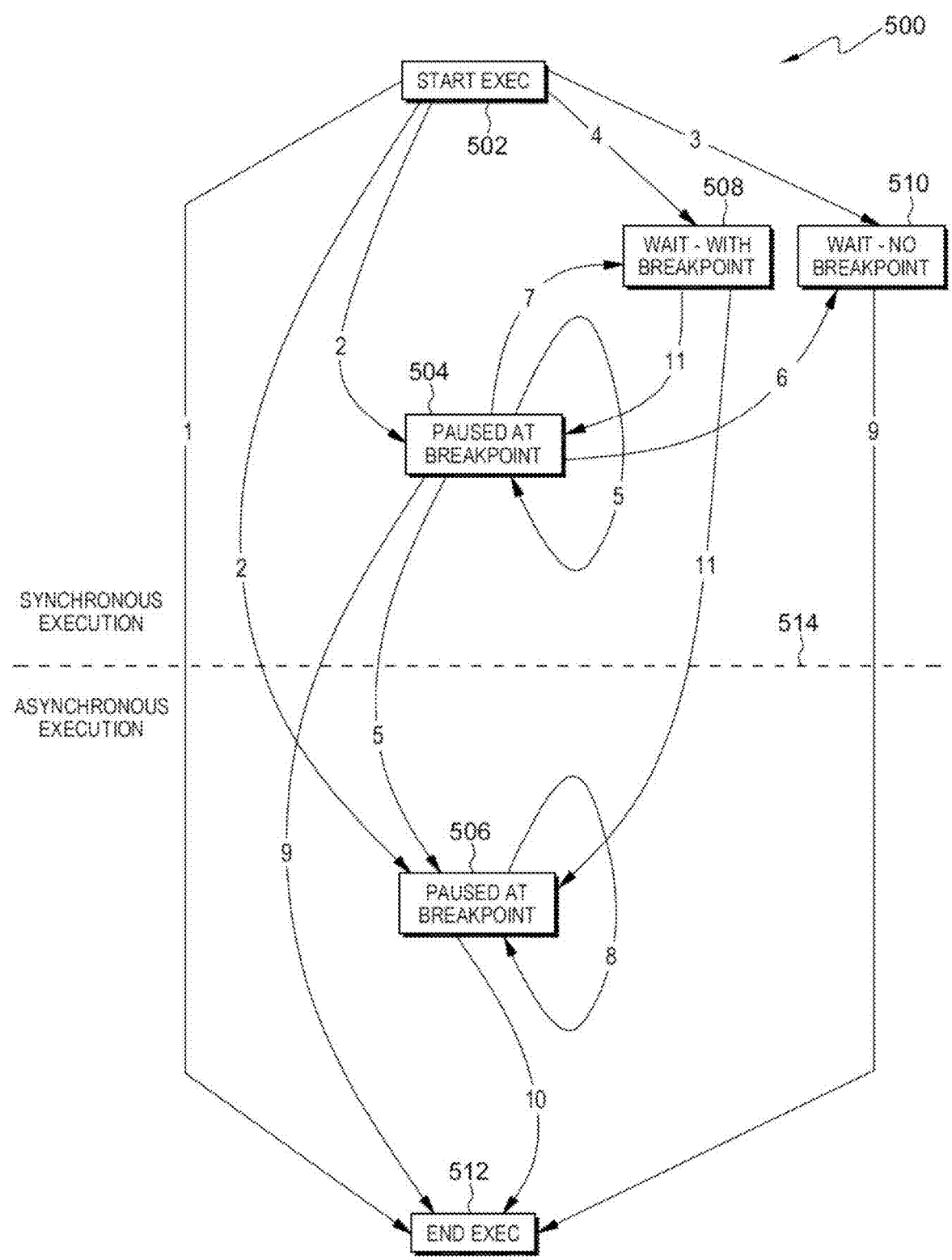
FIG. 5 is a diagram illustrating the functioning of the special library APIs, according to an embodiment of the present disclosure.

Referring now to FIG. 5, a diagram 500 illustrating functioning of the library API is shown, according to an embodiment of the present disclosure. In this figure, rectangular boxes 502, 504, 506, 508, 510, and 512 represent various states of execution for a request in a job. A dotted horizontal line 514 depicts a division between synchronous and asynchronous execution phases of work done by the server program to fulfill a request. Solid arrows 1, 2, 3, 4, 5, 6, 7, 8, 9, 10 and 11 show the APIs provided by the library. Each number (e.g., 1, 2, 3, 4, 5, 6, 7, 8, 9, 10 or 11) is associated with the number in the "Number" column as described in Table 1 below. These APIs may be used to pause or resume execution of a request in a job to or from a state (e.g., 502, 504, 506, 508, 510, or 512).

The numbered APIs (e.g., 1, 2, 3, 4, 5, 6, 7, 8, 9, 10 or 11) shown in FIG. 5 and described in Table 1 may be used to transition in both phases of execution (synchronous and asynchronous) between the following states:

Start exec (502): Start of execution. A request to be executed in a job may enter this state only after a previous request in that job has completed the synchronous execution phase.

End exec (512): End of synchronous as well as asynchronous execution phases of a request.

Paused at breakpoint (504 or 506): Paused at a breakpoint in the server program in synchronous (504) or asynchronous (506) execution phase (e.g., suspendIfFileExists (<breakpoint_name_string>, getIdOfCurrentJob ( )) call in the server program)

Wait (508 or 510): The execution is currently waiting (e.g., a request has been queued due to dependency on another condition to be satisfied or to prevent conflicting access to certain resource(s)). In case of "WAIT—WITH BREAKPOINT" (508), there may be a future breakpoint in a synchronous or asynchronous code path specified for this execution using either startExecAndWait ( ) (API number 4) or continueExecAndWait ( ) (API number 7). (note that incoming arrows for state 508 in FIG. 5 have numbers 4 and 7). In that case, execution may pause at the breakpoint after the dependency or conflict is resolved. In such cases, the delayUntilBreakpoint ( ) API (API number 11) may be used after the dependency or conflict is resolved (note that outgoing arrows for state 508 in FIG. 5 have number 11). By doing this, execution of subsequent statements in the test case can be delayed until the breakpoint is reached. If there is no future breakpoint in the synchronous or asynchronous code paths (510, "WAIT—NO BREAKPOINT"), then as shown in the diagram, the only option for this request after its dependency or conflict has been resolved is to use the finishExec ( ) API (API number 9) to complete execution of the request.

TABLE 1

| Number | Associated API |
| --- | --- |
| 1 | execute (job, request) |
| 2 | startExec (job, request, nextBreakpoint, [, nodeList]) |
| 3 | startExecAndWait (job, request) |
| 4 | startExecAndWait (job, request, futureBreakpoint, [, nodeList]) |
| 5 | continueExec (job, nextBreakpoint, [, nodeList]) |
| 6 | continueExecAndWait (job) |
| 7 | continueExecAndWait (job, futureBreakpoint, [, nodeList]) |
| 8 | continueAsyncExec (job, currentAsyncBreakpoint, nextAsyncBreakpoint, [, nodeList]) |
| 9 | finishExec (job, [, nodeList]) |
| 10 | finishAsyncExec (job, currentAsyncBreakpoint, [, nodeList]) |
| 11 | delayUntilBreakpoint (job) |
| 12 | createJob (server) |

A detailed description of each API in Table 1 is provided below:

1. execute (job, request): Completely executes a request in a given job without pausing.

2. startExec (job, request, nextBreakpoint [, nodeList]): Creates the breakpoint and then starts execution of the request in the given job so that the execution may pause at the breakpoint. This API waits until the specified breakpoint is reached and then returns back to the caller. Optionally, nodeList may be included in order to pause the execution at the given breakpoint on all nodes in the list.

3. startExecAndWait (job, request): This API is used if execution of the request is expected to wait because of a dependency or conflicting access to common resource(s) (for example, a transaction in an RDBMS that supports serializable isolation level may be internally queued due to a serialization conflict with another concurrent transaction). After the dependency or conflict is resolved, finishExec ( ) API (API number 9) must be used to complete the execution. For example:

```
startExecAndWait (job, request)
// Resolve dependency or conflict of the job request
finishExec (job)
```

4. startExecAndWait (job, request, futureBreakpoint [, nodeList]): This API is used when both of the following are true: (a) Execution of the request is expected to wait because of a dependency or conflicting access to common resource(s) (for example, a transaction in an RDBMS that supports serializable isolation level may be internally queued due to a serialization conflict with another concurrent transaction), and (b) After the dependency or conflict is resolved, the execution is to be paused at a synchronous or asynchronous breakpoint. It should be noted that after the dependency or conflict is resolved, the delayUntilBreakpoint ( ) API (API number 11) must be used to ensure that the breakpoint has been reached. Optionally, nodeList may be provided in order to pause at the given futureBreakpoint on all nodes in the list. For example:

```
startExecAndWait (job, request, futureBreakpoint [, nodeList])
// Resolve dependency of the job
delayUntilBreakpoint (job)
// Use appropriate API calls to continue/finish execution
```

5. continueExec (job, nextBreakpoint [, nodeList]): This API create the nextBreakpoint and then deletes the current breakpoint so that execution of the request resumes beyond its current breakpoint. Additionally, this API waits until the specified subsequent breakpoint (nextBreakpoint) is reached and then returns back to the caller. Optionally, nodeList may be provided in order to pause at the given breakpoint on all nodes in the list.

6. continueExecAndWait (job): This API is used if execution of the request is expected to wait when it is resumed from its current breakpoint because of a dependency or conflicting access to common resource(s). After dependency or conflict is resolved, finishExec ( ) API (API number 9) must be used to complete the execution. For example:

```
continueExecAndWait (job)
// Resolve dependency of the job
finishExec (job)
```

7. continueExecAndWait (job, futureBreakpoint [, nodeList]): This API is used when both of the following are true: (a) Execution of the request beyond its current breakpoint is expected to wait because of a dependency or conflicting access to common resource(s), and (b) After the dependency or conflict is resolved, the execution is to be paused at another synchronous or asynchronous breakpoint. It should be noted that the after the dependency or conflict is resolved, delayUntilBreakpoint ( ) (API number 11) API must be used to ensure that the breakpoint has been reached. Optionally, nodeList may be provided in order to pause at the given breakpoint on all nodes in the list. For example:

```
continueExecAndWait (job, futureBreakpoint [, nodeList])
// Resolve dependency of the job request
delayUntilBreakpoint (job)
// Use appropriate API calls to continue/finish execution
```

8. continueAsyncExec (job, currentAsyncBreakpoint, nextAsyncBreakpoint [, nodeList]): Resumes execution of an asynchronous code path for the job request beyond its current breakpoint (currentAsyncBreakpoint) until a subsequent breakpoint (nextAsyncBreakpoint). Additionally, waits until the specified subsequent breakpoint (nextAsyncBreakpoint) is reached and then returns back to the caller. Optionally, nodeList may be provided in order to pause at the given asynchronous breakpoint on all nodes in the list. This API requires the current asynchronous breakpoint name (currentAsyncBreakpoint) because a job may have more than one asynchronous breakpoint (e.g., associated with multiple previously executed requests).

9. finishExec (job [, nodeList]): Resumes execution of the request in the job beyond its current breakpoint, if any, and waits until execution completes. Then, it returns back to the caller.

10. finishAsyncExec (job, currentAsyncBreakpoint [, nodeList]): Resumes and finishes execution of an asynchronous code path for the job beyond its current breakpoint. This API requires the current asynchronous breakpoint name because a job may have more than one asynchronous breakpoint (e.g., associated with multiple previously executed requests).

11. delayUntilBreakpoint (job): Delays execution of subsequent statements in the test case until a future breakpoint specified for the request (using either startExecAndWait ( ) or continueExecAndWait ( )) is reached. These are the preconditions: (a) The job was hanging (waiting) due to a dependency or conflicting access to common resource(s), and (b) A future breakpoint was specified for it using either startExecAndWait ( ), continueExecAndWait ( ) API, and (c) The dependency or conflict has been resolved and the request can now reach the breakpoint.

12. createJob ( ) (Not shown in FIG. 5): As described above, a new job may be created by calling the createJob ( ) API. This API internally retrieves a job identifier from the server program using the Job Manager 108C (FIG. 1) which saves the job identifier in an internal data structure for later use.

Below is a description of the arguments used in the APIs of Table 1:

job: Embodies the job object. It has to be created using the createJob ( ) API (API number 12) provided by the library, because the createJob ( ) API internally retrieves the job identifier from the server program using the Job Manager 108C (FIG. 1) which saves it in an internal data structure for later use.

request: The request to be run in a job (e.g., SQL command).

nextBreakpoint, currentAsyncBreakpoint, nextAsyncBreakpoint, futureBreakpoint: Represent the breakpoint-name strings.

nodeList: In embodiments in which the server is a distributed server, the nodeList includes a list of nodes that constitute such server. These are the nodes on which the API creates nextBreakpoint or futureBreakpoint or nextAsyncBreakpoint specified as an argument to the API. For example, continueAsyncExec (job, currentAsyncBreakpoint, nextAsyncBreakpoint [, nodeList]) API may create file /tmp/nextBrkpt_67812 on all nodes specified in the nodeList argument assuming that job identifier is 67812 and the nextAsyncBreakpoint argument is a breakpoint named "nextBrkpt". In some instances, only a subset of nodes may be passed to these library functions. Note that test cases may use different breakpoints on different set of nodes during execution of a job request. For example, assuming that nodes are identified using integer numbers, startExec (job, request, "brkpt1", [1, 2, 3, 4, 5]) API may be used to pause the request at a breakpoint named "brkpt1" on all five nodes of a distributed server. In addition to storing information about the job identifier, thread of execution and current breakpoint ("brkpt1" in this example) inside the library API code, this API may also store list of nodes (1 through 5 in this example) on which execution of the request is currently paused. This additional information is used to resume execution of the request beyond its current breakpoint as described next.

Subsequently, continueExec (job, "brkpt2", [4, 5]) API may be used to resume the request beyond "brkpt1" and then pause it at breakpoint named "brkpt2" on nodes 4 and 5. In an embodiment of the present disclosure, the continueExec API may leave the request paused at breakpoint "brkpt1" on nodes 1, 2 and 3. Then, finishExec (job, [1, 2, 3]) API may be used to resume the request beyond "brkpt1" on nodes 1, 2 and 3, and finish execution of the request on those nodes. Finally, finishExec (job, [4, 5]) API may be used to resume the request beyond "brkpt2" on nodes 4 and 5, and finish execution of the request on those nodes. It should be noted that the nodeList argument is optional, if it is not specified then the API is executed against the master/coordinator node.

server: server program 112 (FIG. 1) in which the new job is to be run.

It should be noted that path number 12 and its associated API are not shown in FIG. 5, because the figure shows life cycle of a request that is executed in a job whereas the createJob API associated with number 12 is for creating a new job on the server. As such, this API is used to create a job in which one or more requests are to be executed in the test case or reproduction script using library API shown in FIG. 5.

Referring now to FIG. 6, a flowchart 600 illustrating an exemplary implementation of the library APIs is shown, according to an embodiment of the present disclosure. It should be noted that arrows in the flowchart 600 may include one or more of the reference numerals 1-12 associated with the different APIs listed in Table 1. More specifically, numbers located next to an arrow in the flowchart 600 indicate the appropriate or applicable solid arrow in FIG. 5.

It should also be noted that, states displayed using rectangular boxes in FIG. 5 are associated with FIG. 6 as follows: START EXEC (502) in FIG. 5 corresponds to START EXECUTION (602) in FIG. 6, "WAIT—WITH BREAKPOINT" (508) and "WAIT—NO BREAKPOINT" (510) in FIG. 5 correspond to WAIT (646) in FIG. 6, PAUSED AT BREAKPOINT in SYNCHRONOUS EXECUTION section of FIG. 5 (504) corresponds to PAUSED AT SYNC BREAKPOINT (620) in FIG. 6, PAUSED AT BREAKPOINT in ASYNCHRONOUS EXECUTION section of FIG. 5 (506) corresponds to PAUSED AT ASYNC BREAKPOINT (634) in FIG. 6, and END EXEC (512) in FIG. 5 corresponds to END EXECUTION (644) in FIG. 6.

Rectangular shapes in the flowchart 600 correspond to processing steps performed by the APIs, whereas diamond shapes are for decisions. As such, the set of numbers on incoming arrows for a rectangular or diamond shape is the same as the set of numbers on outgoing arrows. For example, incoming arrows for decision 612 in FIG. 6A have numbers 2, 3, 4, 5, 6 and 7, and outgoing arrows for the decision also have the same set of numbers. Also, incoming arrow for activity 604 in FIG. 6A has numbers 1, 2, 3 and 4, and outgoing arrows for the same activity also have the same set of numbers. But circular and oval shapes in the flowchart are for states of execution, and as such may not have an incoming arrow (for example, circles 602 and 674 corresponding to the START state) or an outgoing arrow (for example, concentric circles 644 and 676 corresponding to the END state) or may have a different set of numbers on incoming and outgoing arrows. This is because an API that brings a request execution to a certain state may not resume execution of the request beyond that state. For example, state PAUSED AT SYNC BREAKPOINT (620) has numbers 2, 5 and 11 on incoming arrows, whereas it has numbers 5, 6, 7 and 9 on outgoing arrows. This is because APIs 2 (startExec) and 11 (delayUntilBreakpoint) bring a job request to the state, but they do not resume the request beyond the state like APIs 6, 7 (continueExecAndWait) and 9 (finishExec) do. API 5 (continueExec) is on both incoming as well as outgoing arrows of the state because that API may take request execution from one synchronous breakpoint to the next.

The flowchart 600 also shows how some of the library APIs spawn a new thread during execution (610). Note that the flowchart has numbers 2, 3 and 4 on arrows that flow into 610, indicating that a new thread is spawned during execution of library APIs 2 (startExec (job, request, nextBreakpoint [, nodeList])), 3 (startExecAndWait (job, request)) and 4 (startExecAndWait (job, request, futureBreakpoint [, nodeList])) listed in Table 1 and shown using solid arrows in FIG. 5. Additionally, the flowchart 600 shows how various data structures may be used to store relationships between jobs, job identifiers, threads and breakpoints including: a map that stores jobs as keys and job identifiers as values (for example (JOB, JOBID) map in 672), a map that stores jobs as keys and threads created by the library API as values (for example (JOB, THREAD) map in 610 and 630), a map that stores threads as keys and current breakpoints as values (for example (THREAD, currentBreakpoint) map in 618 and 626), a map that stores threads as keys and future breakpoints as values (for example (THREAD, futureBreakpoint) map in 654 and 658), and a map that stores jobs as keys and a list of breakpoints in the asynchronous execution as values (for example (JOB, LIST (asyncBreakpoints)) map in 632 and 642, this map stores a list of asynchronous breakpoints because a job may have more than one asynchronous breakpoint associated with multiple previously executed requests).

Additionally, the flowchart 600 shows how the library APIs use these maps to check whether the library APIs have been used at the right place in the test case as described below. The CHECK INACTIVE (604) check is used to ensure that the job is not currently active i.e. it is not currently executing a request. CHECK INACTIVE (604) checks that (JOB, THREAD) map does not contain the job as key. Note that the flowchart 600 has numbers 1, 2, 3 and 4 on the arrow that flows into 604, indicating that this check is performed for APIs 1 through 4 listed in Table 1 and shown using solid arrows in FIG. 5. This check is performed for those APIs because they either completely execute a new request in the job without pausing the request at a breakpoint (API 1) or start execution of a new request in the job (APIs 2, 3 and 4). Also, the CHECK ACTIVE (622) check is used to ensure that the job is currently active i.e. it is currently executing a request. CHECK ACTIVE (622) checks that the (JOB, THREAD) map contains the job as key and the thread is in the (THREAD, currentBreakpoint) map.

As shown in FIG. 6, CHECK ACTIVE (622) is used for APIs 5, 6 and 7 listed in Table 1 and shown using solid arrows in FIG. 5. These three APIs continue execution of a request that is currently running inside the job, for this reason they perform the CHECK ACTIVE (622) check.

Additionally, the CHECK ACTIVE ASYNC (638) check is used to ensure that the job has an active asynchronous execution, it checks that the (JOB, LIST (asyncBreakpoints)) map contains the job as key and the LIST (asyncBreakpoints) contains the currentAsyncBreakpoint which is passed as an argument to the APIs that use this check. Note that the flowchart has numbers 8 and 10 on the arrow that flows into 638, indicating that this check is performed for APIs 8 (continueAsyncExec (job, currentAsyncBreakpoint, nextAsyncBreakpoint [, nodeList])) and 10 (finishAsyncExec (job, currentAsyncBreakpoint [, nodeList])) listed in Table 1 and shown using solid arrows in FIG. 5.

Also, the CHECK CAN FINISH (622 and 650) check is used to ensure that execution of the request that is currently running inside the job can finish. CHECK CAN FINISH (622 and 650) checks that the (JOB, THREAD) map contains the job as key, and that the thread is not in (THREAD, futureBreakpoint) map. It should be noted that 622 in the flowchart 600 contains the text "CHECK CAN FINISH (FOR 9)". Additionally, the flowchart 600 includes number 9 on the arrow that flows into 650, indicating that this check is performed for API 9 (finishExec (job [, nodeList])) listed in Table 1 and shown using solid arrow in FIG. 5.

The CHECK CAN CONTINUE (656) check is used to ensure that the API 11 (delayUntilBreakpoint (job)) has been used appropriately to delay execution of subsequent statements in the test case until the futureBreakpoint that was specified for the job request is reached. Note that the flowchart has number 11 on the arrow that flows into 656, indicating that this check is performed for API 11 listed in Table 1 and shown using solid arrows in FIG. 5. CHECK CAN CONTINUE (656) checks that the (JOB, THREAD) map contains the job as key, and that the thread is in the (THREAD, futureBreakpoint) map.

It should be noted that dotted lines in the flowchart between server 680 and activities 608, 610, 670 and 672 indicate that these activities use the Server Program 112 (FIG. 1) to perform an operation. For example, activity 670 creates a new job on the server program, activity 672 retrieves the job identifier (the server program may return the job identifier in response to the job creation request sent by 670, or the server program may provide a special request syntax, such as SQL statement "SELECT current_job_id", to get the identifier of a job in which the special request syntax is executed), and activities 608 and 610 send a request to be executed in the server program.

It should also be noted that some of the activities in the flowchart 600 interact with the Job-aware Breakpoint Program 112A (FIG. 1) of the server (e.g. server program 112 in FIG. 1) as will be described below.

Activities 606, 624, 640 and 652 create job-specific breakpoints, for example by creating file /tmp/brkpt_74524 on the server computer 114 (FIG. 1) in this exemplary implementation. Activities 626 and 642 remove job-specific breakpoints, for example by removing file /tmp/brkpt_74524 from the server computer in this exemplary implementation. Activities 614, 636 and 658 wait until execution of a job inside server program 112 (FIG. 1) has reached a job-specific breakpoint, for example until file /tmp/brkpt_74524.paused gets created on the server computer as described above with reference to FIG. 3. In an exemplary implementation, further execution of the library API may be delayed using a sleep statement until file /tmp/brkpt_74524.paused gets created on the server computer.

Figure 6A:
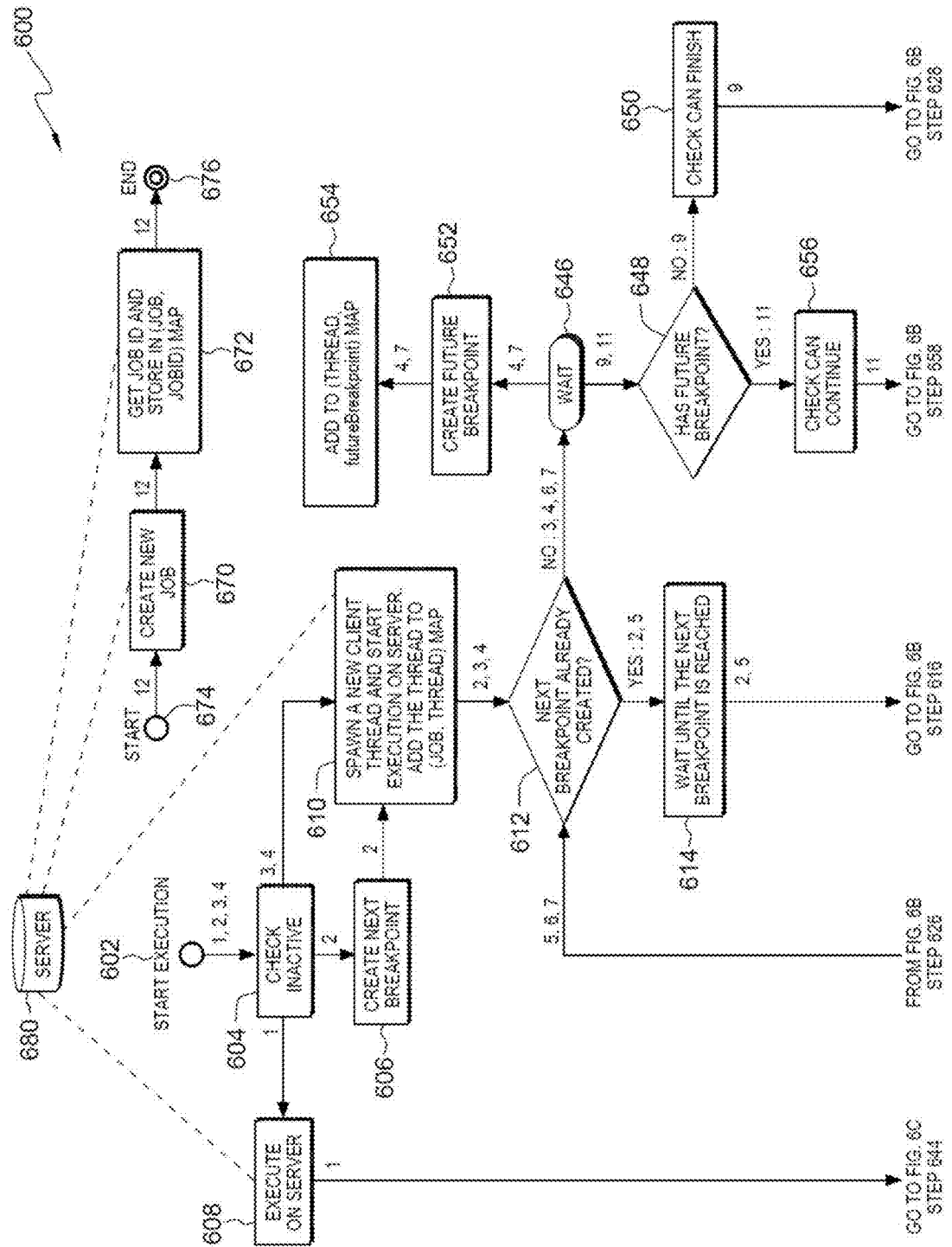
FIGS. 6A-6C depict a flowchart illustrating an exemplary implementation of the special library APIs, according to an embodiment of the present disclosure.
Figure 6B:
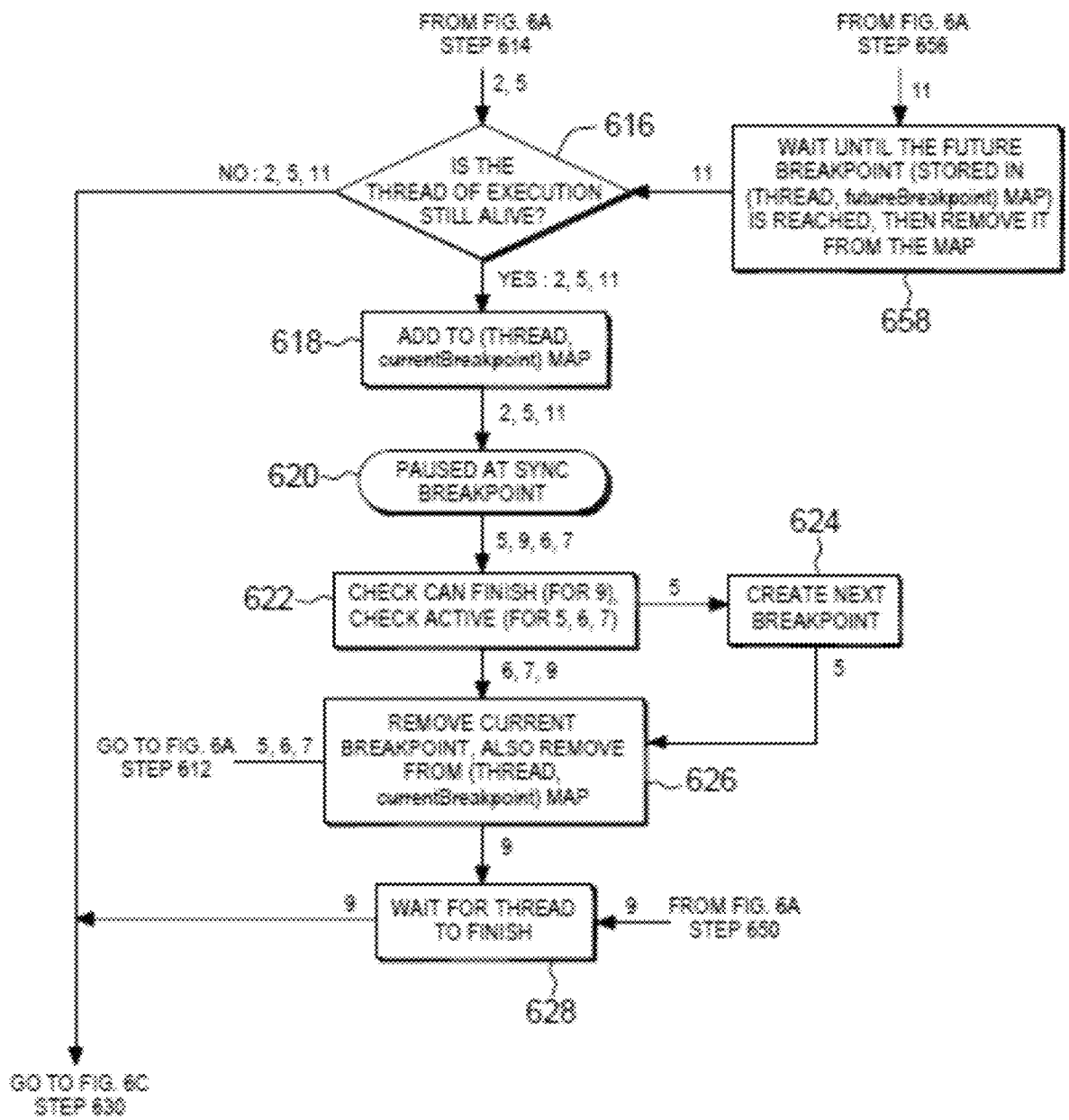
Figure 6C:
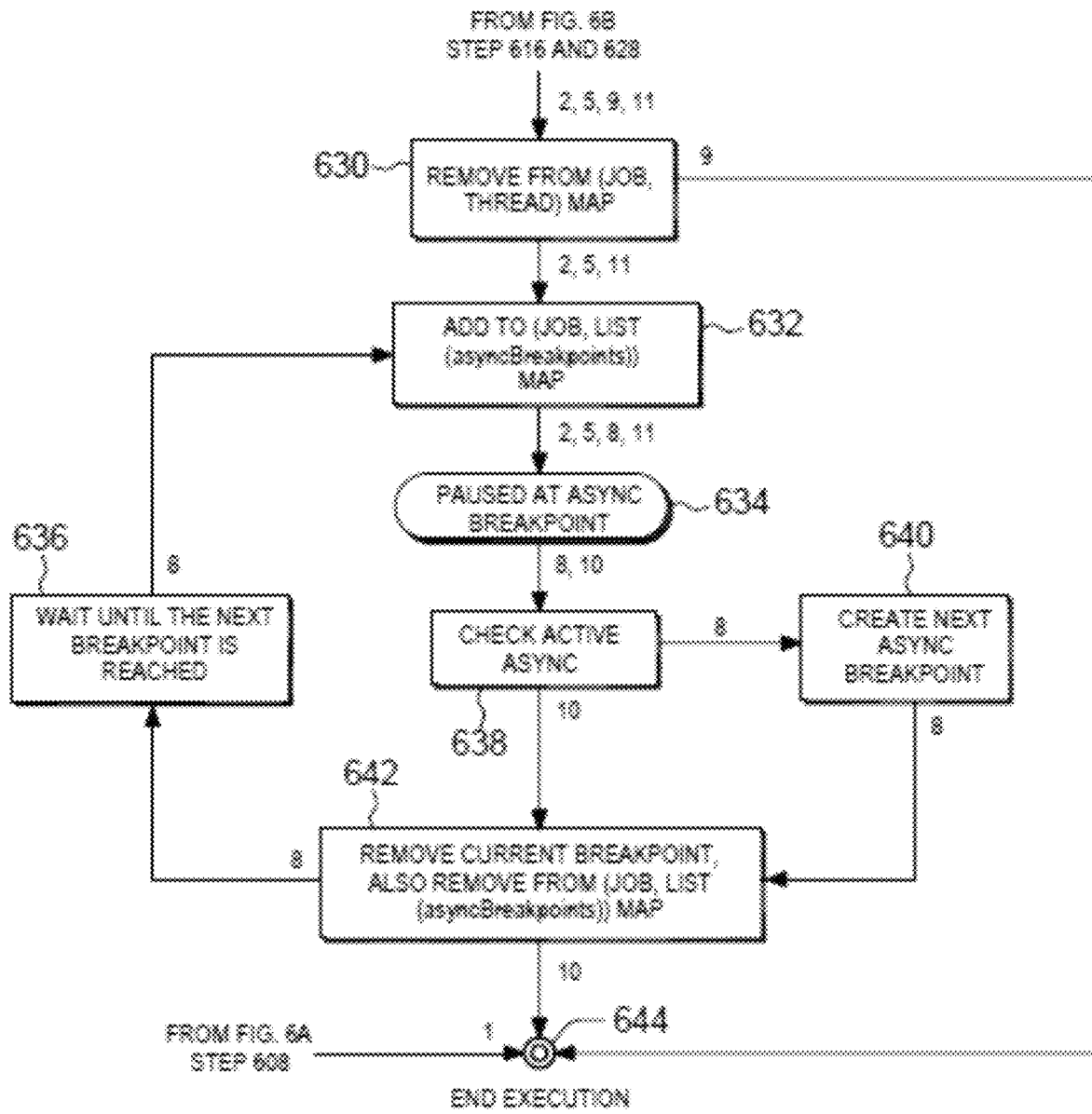

Activities performed during execution of library API 12 (createJob) are depicted at top of FIG. 6A. At step 674, execution of the API starts. At step 670, the API uses Job Manager 108C (FIG. 1) to create a new job in the Server Program 112 (FIG. 1). The Job Manager 108C (FIG. 1) also retrieves an identifier for the new job from the Server Program 112 (FIG. 1) at step 672 and stores the identifier in (JOB, JOBID) map, for future use by other library APIs as will be described below.

The flowchart 600 also depicts activities performed to execute a request inside a job using APIs 1 through 11. As such, API 12 must be invoked inside a test case to create a job before APIs 1 through 11 are invoked to execute a request inside the job. Activities performed during execution of library API 2 (startExec) are depicted in the flowchart using solid arrows that have the number 2. At step 602, execution of a new request starts. At step 604 (CHECK INACTIVE) in FIG. 6A, the library API 2 checks the status of the received job to ensure that the job is not currently active i.e. it is not currently executing a request. Specifically, the API uses Thread Manager 108D (FIG. 1) to check whether the (JOB, THREAD) map does not include the specified job.

Then, at step 606, the API uses Breakpoint Manager 108E (FIG. 1) to create job-specific breakpoint using Job-Aware Breakpoint Program 112A (FIG. 1). In order to do that, the API gets the identifier of the job from the Job Manager 108C (FIG. 1) which stores the identifier in (JOB, JOBID) map as described above. In this exemplary embodiment, the job-specific breakpoint may be created by creating a file such as /tmp/brkpt_47567 on server computer assuming that "brkpt" is name of the breakpoint passed to the startExec API number 2 using the nextBreakpoint argument of the API and 47567 is the job identifier. Next, at step 610, the API uses Thread Manager 108D (FIG. 1) to spawn a new thread, start execution of the request inside the thread and store the thread in (JOB, THREAD) map. As previously described, this is a client-side thread inside the library API created using syntax of the programming language used for implementing the library API, which is different than a thread that the Server Program may create to support concurrent client requests. Later, since the breakpoint has already been created, the condition 612 evaluates to YES and then at step 614 the API delays its further processing until the breakpoint is reached.

As described above, the API may add the delay using a sleep statement until file /tmp/brkpt_47567.paused gets created on the server computer 114 (FIG. 1) in this exemplary embodiment. Then, at the decision 616 in FIG. 6B, the API checks whether the thread that was created in previous step 610 is still alive using thread-related syntax of the programming language that is used for implementing the library API. This check is used to determine whether the breakpoint "brkpt" is in synchronous or asynchronous code path of the Server Program 112 (FIG. 1). If the thread is still alive, then the decision evaluates to YES, meaning the breakpoint "brkpt" is in synchronous execution path. At step 618, the Thread Manager 108D (FIG. 1) adds the thread to (THREAD, currentBreakpoint) map for future use by other APIs as will be described below. This is how the startExec API may start execution of a request at 602 and take the request execution to PAUSED AT SYNC BREAKPOINT state 620.

Alternatively, if the decision at 616 is NO (thread of execution is complete) the breakpoint "brkpt" is in asynchronous execution path. Consequently, at step 630 in FIG. 6C, the Thread Manager 108D (FIG. 1) removes this completed thread from (JOB. THREAD) map. Then, at step 632, the Breakpoint Manager 108E (FIG. 1) adds the breakpoint to (JOB, LIST (asyncBreakpoints)) map for future use by other APIs as will be described below. This is how the startExec API may start the execution of a request at 602 and take the request execution to PAUSED AT ASYNC BREAKPOINT state 634. If a request is in PAUSED AT SYNC BREAKPOINT state 620 then, as can be seen from numbers on its outgoing arrow, it can be taken forward using either of the APIs 5 (continueExec), 6 or 7 (continueExecAndWait), or 9 (finishExec).

For example, the steps for finishExec API (API 9) can be traced in the flowchart 600 by using the arrows that have number 9. First, at step 622, the API 9 performs a check (CHECK CAN FINISH) to ensure that execution of the request that is currently running inside the job can finish. Specifically, it checks using the Thread Manager 108D (FIG. 1) that the (JOB, THREAD) map contains the job as key, and also confirms using the Breakpoint Manager 108E (FIG. 1) that the thread is not in (THREAD, futureBreakpoint) map. Then, at 626, the Breakpoint Manager 108E (FIG. 1) removes the current breakpoint. For this step, the API uses the Thread Manager's (JOB, THREAD) map to get the thread associated with the request, and then it uses Breakpoint Manager's (THREAD, currentBreakpoint) map to obtain the name of the breakpoint to be removed, such as "brkpt". The API also uses Job Manager's (JOB, JOBID) map to get the identifier for the job, such as 47567. In this exemplary implementation, this API deletes the /tmp/brkpt_47567 file from the server computer 114 (FIG. 1) in order to remove the breakpoint in step 626. Then, in the same step, the API removes the breakpoint stored in Breakpoint Manager's (THREAD, currentBreakpoint) map. At step 628, the API delays further processing until the thread finishes execution. The API may use thread-related syntax of the programming language used for implementing the library API to check whether the thread is still alive, and add delay using a sleep statement until the thread is alive. At step 630, the API removes the entry in Thread Manager's (JOB, THREAD) map. Finally, execution of the request goes into END EXECUTION state (644).

Similarly, if a request is in PAUSED AT ASYNC BREAKPOINT state 634 then, as can be seen from numbers on its outgoing arrow, it can be taken forward using either of the APIs 8 (continueAyncExec), or 10 (finishAyncExec). For example, the steps for finishAyncExec API (API 10) can be traced in the flowchart 600 by using the arrows that have number 10. First, at step 638, the API 10 performs a check (CHECK ACTIVE AYNC) to ensure that the job has an active asynchronous execution. Specifically, the API 10 checks using the Breakpoint Manager 108E (FIG. 1) that the (JOB, LIST (asyncBreakpoints)) map contains the job as key and the LIST (asyncBreakpoints) contains the currentAsyncBreakpoint which is passed as an argument to the API. Then, at 642, the Breakpoint Manager 108E (FIG. 1) removes the currentAsyncBreakpoint. For this step, the API uses Job Manager's (JOB, JOBID) map to get the identifier for the job, such as 47567. In this exemplary implementation, assuming that the breakpoint in asynchronous code of the Server Program 112 (FIG. 1) is named "async_brkpt", this API deletes the /tmp/async_brkpt_47567 file from the server computer in order to remove the breakpoint in step 642. Next, in the same step, the library API removes the breakpoint stored in Breakpoint Manager's (JOB, LIST (asyncBreakpoints)) map. Finally, execution of the request goes into END EXECUTION state (644).

As such, a method for testing a server code in a server concurrently handling multiple client requests includes creating a job-specific breakpoint in the server code using the library APIs, where the job-specific breakpoint in the server code is enabled or disabled based on a job identifier, the library APIs control the job-specific breakpoint in the server code. The library APIs include an application programming interface for establishing a new server connection with the server and retrieving the job identifier from the server associated with the established new server connection. The execution of a client job is paused based on enabling the job-specific breakpoint in the server code using the library APIs. The execution of the client job is resumed based on disabling the job-specific breakpoint in the server code using the library API.

Moreover, the job-specific breakpoints in the server code allow creating readable and repeatable reproduction scripts and test cases containing interleaved executions of parallel client requests. The method further includes an application programming interface to create a new thread of execution for every client request executed in the client job using syntax of the programming language used for implementing the library API. The library API retains information about relationships between client jobs, job identifiers, threads, and breakpoints including node specific breakpoints. According to an embodiment, the library API allows queuing of client requests.

The method further includes testing the server codes based on one or more of the following interactions: interaction between synchronous and asynchronous execution of client requests submitted concurrently from two or more different client jobs, interaction between nodes of the server, and interaction between asynchronous execution of a previous client request and synchronous and asynchronous execution of a subsequent client request in same client job for a given client. The one or more interactions are a result of a state change including failure of a node in a cluster or any state change in a specialized state-machine used by server components. The job-specific breakpoint is located in a synchronous execution path or an asynchronous execution path in the server code.

The method further includes performing one or more of the following error checks using the library API determining whether a client job has been created, determining whether the client job is currently executing another client request, determining whether execution of the another client request is currently paused at a job-specific breakpoint, determining whether execution of the client job is currently paused at a specified asynchronous breakpoint, determining whether there is no future breakpoint specified for the client job, and determining whether a future breakpoint has been specified for the client job.

The method further includes creating the job-specific breakpoint in the server code for a node of the server using the library API, and pausing execution of the client job based on enabling the job-specific breakpoint in the server code for the node of the server using the library API.

The method further includes deleting the job-specific breakpoint in the server code for a node of the server using the library API, and resuming execution of the client job based on disabling, the job-specific breakpoint in the server code for the node of the server using the library API.

Therefore, embodiments of the present disclosure may, among other potential benefits, provide a method, system and computer program product to include breakpoints in a program logic, such that pause/resume of execution of parallel requests handled by the program at/from the breakpoints can be externally controlled thereby providing precise control over a sequence of execution corresponding to each individual request through those breakpoints relative to other parallel executing requests. Moreover, embodiments of the present disclosure enable creation of readable and repeatable reproduction scripts/test cases containing interleaved executions of such parallel requests through various breakpoints.

As such, embodiments of the present disclosure may provide a mechanism for reproducing, debugging and testing (regression as well as stress/random) of complex server implementations that involve interactions between nodes of a distributed system that process client requests in parallel, synchronous and asynchronous executions of requests submitted concurrently by different client jobs, asynchronous execution of a previous client request, synchronous/asynchronous execution of a subsequent request in the same job, and effects of state changes on various concurrency scenarios.

Figure 7:
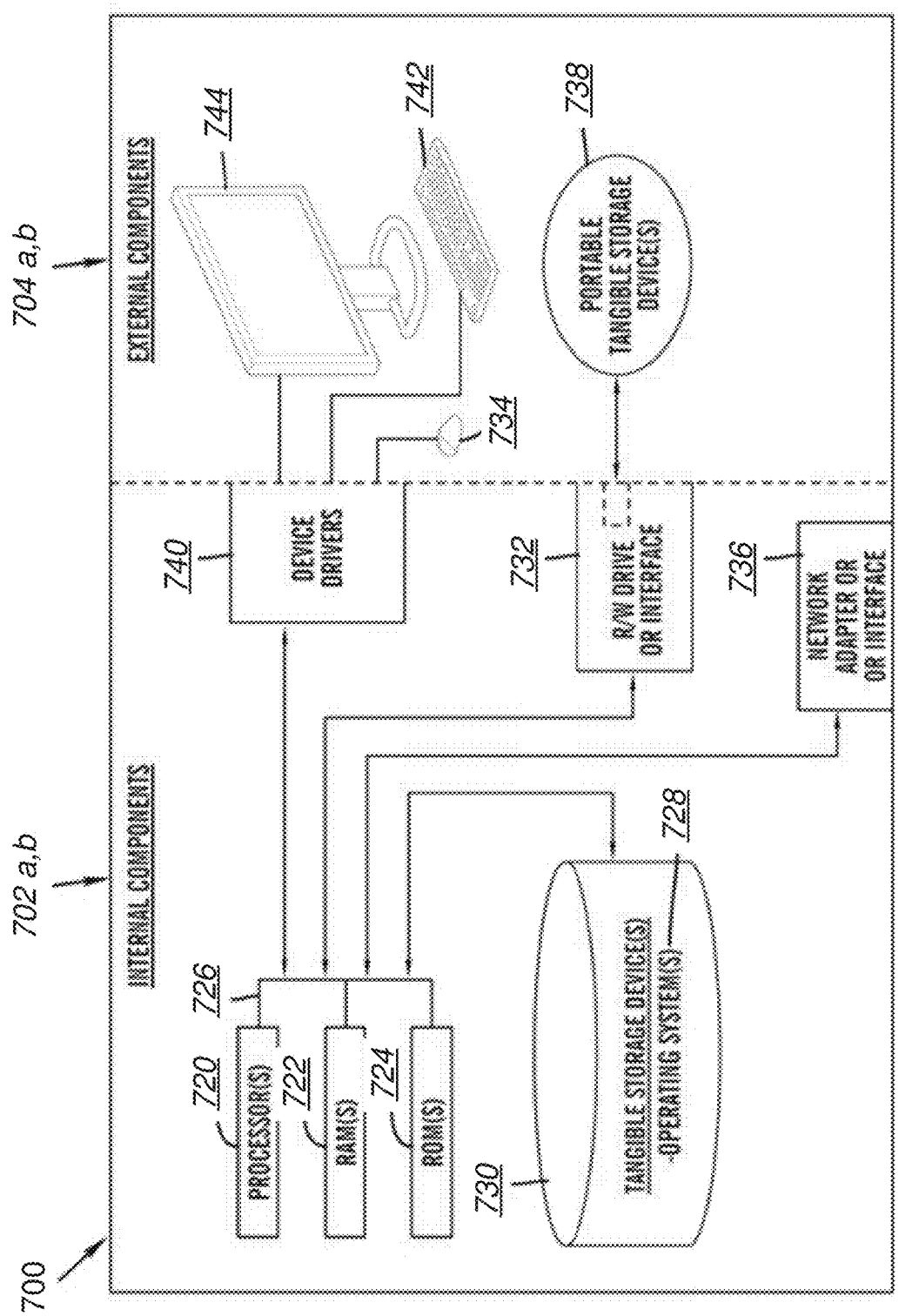
FIG. 7 is a block diagram of internal and external components of computers and servers depicted in FIG. 1, according to an embodiment of the present disclosure.

Referring now to FIG. 7, a block diagram 700 of internal and external components of computers depicted in FIG. 1 is shown according to an embodiment of the present disclosure. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 702, 704 is representative of any electronic device capable of executing machine-readable program instructions. Data processing system 702, 704 may be representative of a smart phone, a computer system, PDA, or other electronic devices. Examples of computing systems, environments, and/or configurations that may represented by data processing system 702, 704 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computer 102 (FIG. 1) and server computer 114 (FIG. 1) may include respective sets of internal components 702a,b and external components 704a,b illustrated in FIG. 7. Each of the sets of internal components 702 include one or more processors 720, one or more computer-readable RAMs 722 and one or more computer-readable ROMs 724 on one or more buses 726, and one or more operating systems 728 and one or more computer-readable tangible storage devices 730. The plurality of programs including the test cases/reproduction script 108A, the library APIs 108B, the job manager 108C, the thread manager 108D, and the breakpoint manager 108E in client computer 102 (FIG. 1) and the server program 112 (including the job-aware breakpoint program 112A) in the server computer 114 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 702a,b also includes a R/W drive or interface 732 to read from and write to one or more portable computer-readable tangible storage devices 738 such as a CD-ROM, DVD, memory stick, magnetic tape, magnetic disk, optical disk or semiconductor storage device. Software programs, such as the first and second plurality of programs described above can be stored on one or more of the respective portable computer-readable tangible storage devices 738, read via the respective R/W drive or interface 732 and loaded into the respective hard drive 730.

Each set of internal components 702a,b also includes network adapters or interfaces 736 such as a TCP/IP adapter cards, wireless Wi-Fi interface cards, or 3G or 4G wireless interface cards or other wired or wireless communication links. The plurality of programs including the test cases/ reproduction script 108A, the library APIs 108B, the job manager 108C, the thread manager 108D, and the breakpoint manager 108E in client computer 102 (FIG. 1) and the server program 112 (including the job-aware breakpoint program 112A) in the server computer 114 (FIG. 1) can be downloaded to the client computer 102 (FIG. 1) and server computer 114 (FIG. 1) from an external computer via a network (for example, the Internet, a local area network or other, wide area network) and respective network adapters or interfaces 736. From the network adapters or interfaces 736, the plurality of programs including the test cases/ reproduction script 108A, the library APIs 108B, the job manager 108C, the thread manager 108D, and the breakpoint manager 108E in client computer 102 (FIG. 1) and the server program 112 (including the job-aware breakpoint program 112A) in the server computer 114 (FIG. 1) are loaded into the respective hard drive 730. The network may include copper wires, optical fibers, wireless transmission, routers, firewalls, switches, gateway computers and/or edge servers.

Each of the sets of external components 704a,b can include a computer display monitor 744, a keyboard 742, and a computer mouse 734. External components 704a,b can also include touch screens, virtual keyboards, touch pads, pointing devices, and other human interface devices. Each of the sets of internal components 702a,b also includes device drivers 740 to interface to computer display monitor 744, keyboard 742 and computer mouse 734. The device drivers 740, R/W drive or interface 732 and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
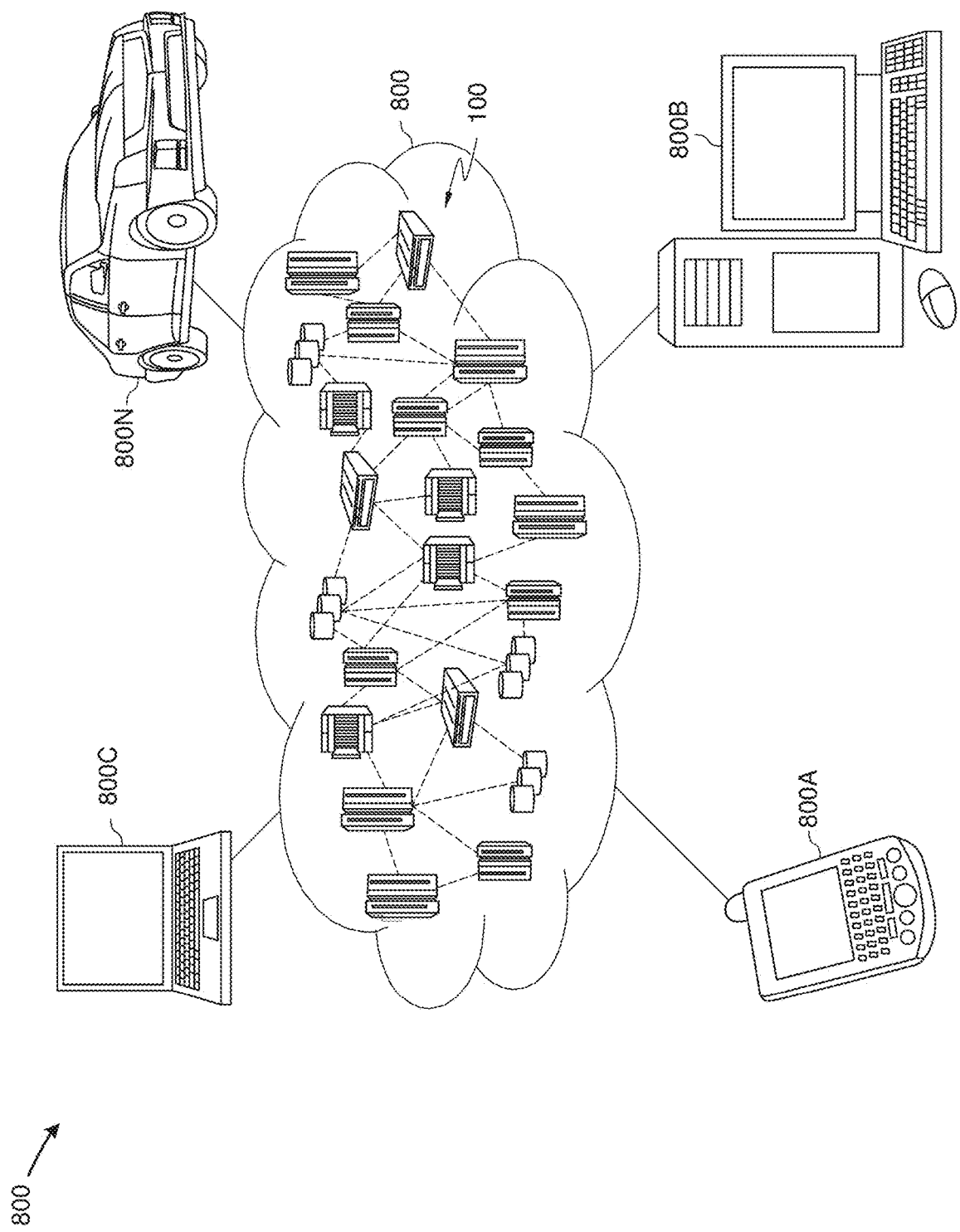
FIG. 8 is a block diagram of an illustrative cloud computing environment including the computer system depicted in FIG. 1, according to an embodiment of the present disclosure.

Referring now to FIG. 8, illustrative cloud computing environment 800 is depicted. As shown, cloud computing environment 800 comprises one or more cloud computing nodes 100 with which local computing devices used by cloud consumers, such as, for example, personal digital assistant (PDA) or cellular telephone 800A, desktop computer 800B, laptop computer 800C, and/or automobile computer system 800N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 800A-N shown in FIG. 8 are intended to be illustrative only and that computing nodes 100 and cloud computing environment 800 can communicate with any type of computerized device over any type of network and/or network addressable connection (e.g., using a web browser).

Figure 9:
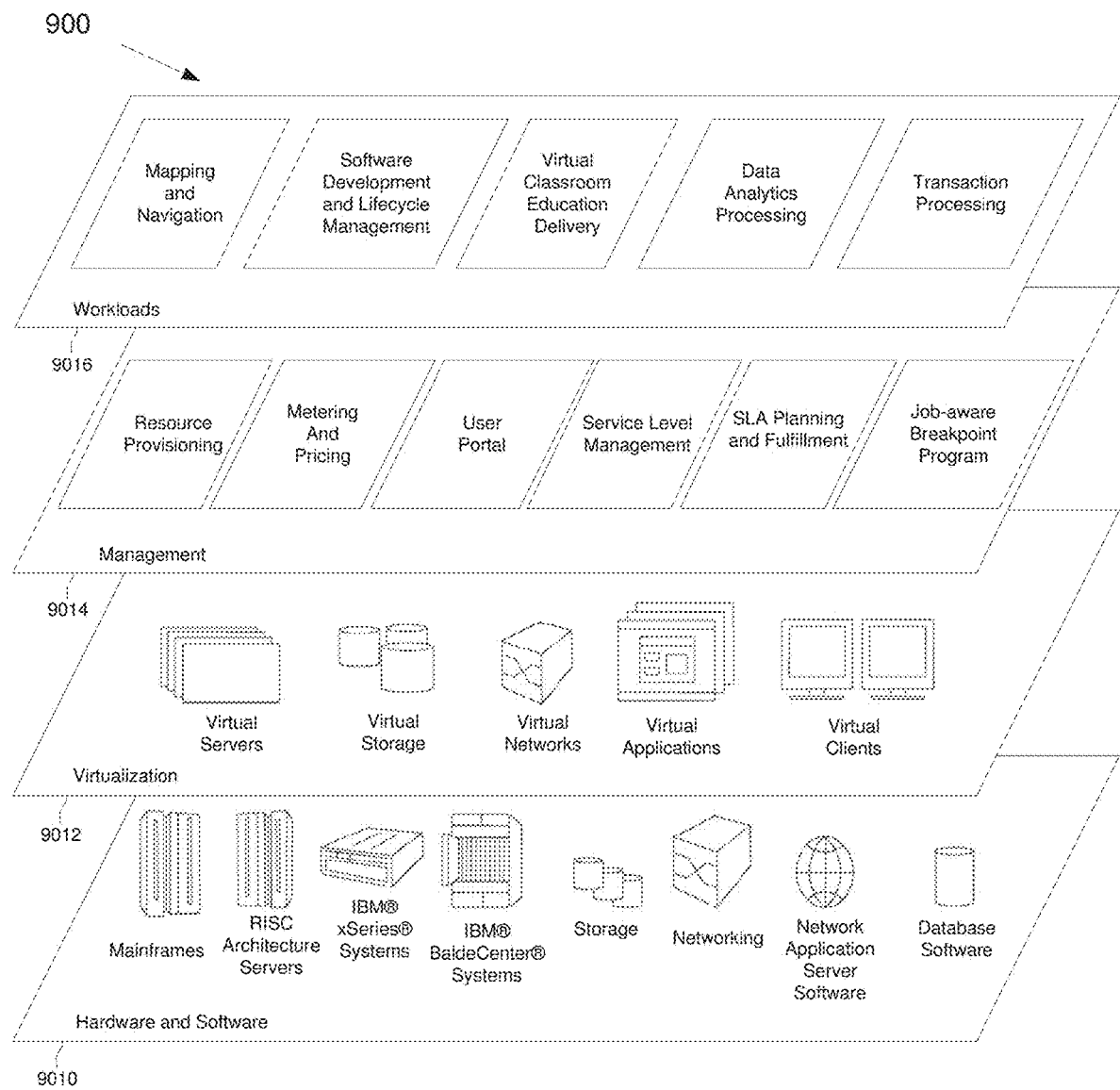
FIG. 9 is a block diagram of functional layers of the illustrative cloud computing environment of FIG. 8, according to an embodiment of the present disclosure.

Referring now to FIG. 9, a set of functional abstraction layers 900 provided by cloud computing environment 800 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 9010 includes hardware and software components. Examples of hardware components include: mainframes; RISC (Reduced Instruction Set Computer) architecture-based servers; storage devices; networks and networking components. In some embodiments, software components include network application server software.

Virtualization layer 9012 provides an abstraction layer from which the following examples of virtual entities may be provided: virtual servers; virtual storage; virtual networks, including virtual private networks; virtual applications and operating systems; and virtual clients.

In one example, management layer 9014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A program for generating location-based advertisement using hybrid radio.

Workloads layer 9016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for testing a server code in a server concurrently handling multiple client requests, comprising:

a computer readable storage medium having program instructions embodied therewith, wherein the computer readable storage medium is not a transitory signal per se, the program instructions executable by a device to cause the device to perform a method comprising:

creating a job-specific breakpoint in the server code using a library application programming interface, wherein the job-specific breakpoint in the server code is enabled or disabled based on a job identifier dynamically retrieved during execution of the server code using the library application programming interface, the library application programming interface controls the job-specific breakpoint in the server code, the library application programming interface comprises a plurality of readymade functions that execute, in a desired sequence, various synchronous and asynchronous program paths associated with the multiple client requests and are capable of establishing a new server connection with the server and retrieving the job identifier from the server associated with the established new server connection;

based on the job identifier, pausing an execution of a client job by enabling the job-specific breakpoint in the server code using the library application programming interface;

based on the job identifier, resuming the execution of the client job by disabling the job-specific breakpoint in the server code using the library application programming interface;

debugging and reproducing one or more concurrency issues in the server code based on the pausing and resuming of the execution of the client job;

writing, using the library application programming interface, readable and repeatable reproduction scripts and test cases containing interleaved executions of parallel client requests through various breakpoints; and performing, using the library application programming interface, one or more of the following error checks:
determining whether a client job has been created;
determining whether the client job is currently executing another client request;
determining whether execution of the another client request is currently paused at a job-specific breakpoint;
determining whether execution of the client job is currently paused at a specified asynchronous breakpoint;

determining whether there is no future breakpoint specified for the client job; and determining whether a future breakpoint has been specified for the client job.

2. The computer program product of claim 1, further comprising:

an application programming interface to create a new thread of execution for every client request executed in the client job using syntax of the programming language used for implementing the library application programming interface.

3. The computer program product of claim 1, wherein the library application programming interface retains information about relationships between client jobs, job identifiers, threads, and breakpoints including node specific breakpoints.

4. The computer program product of claim 1, wherein the library application programming interface allows queuing of client requests.

5. The computer program product of claim 1, wherein the server code is tested based on one or more of the following interactions:

interaction between synchronous and asynchronous execution of client requests submitted concurrently from two or more different client jobs;

interaction between nodes of the server; and interaction between asynchronous execution of a previous client request and synchronous and asynchronous execution of a subsequent client request in same client job for a given client.

6. The computer program product of claim 5, wherein the one or more interactions are a result of a state change including failure of a node in a cluster or any state change in a specialized state-machine used by server components.

7. The computer program product of claim 1, wherein the job-specific breakpoint is located in a synchronous execution path or an asynchronous execution path in the server code.

8. The computer program product of claim 1, further comprising:

creating the job-specific breakpoint in the server code for a node of the server using the library application programming interface; and pausing execution of the client job based on enabling the job-specific breakpoint in the server code for the node of the server using the library application programming interface.

9. The computer program product of claim 1, further comprising:

deleting the job-specific breakpoint in the server code for a node of the server using the library application programming interface; and resuming execution of the client job based on disabling, the job-specific breakpoint in the server code for the node of the server using the library application programming interface.

\* \* \* \* \*